J. MILLER.
VALVE DEVICE.
APPLICATION FILED JULY 20, 1908.
943,838.
Patented Dec. 21, 1909.
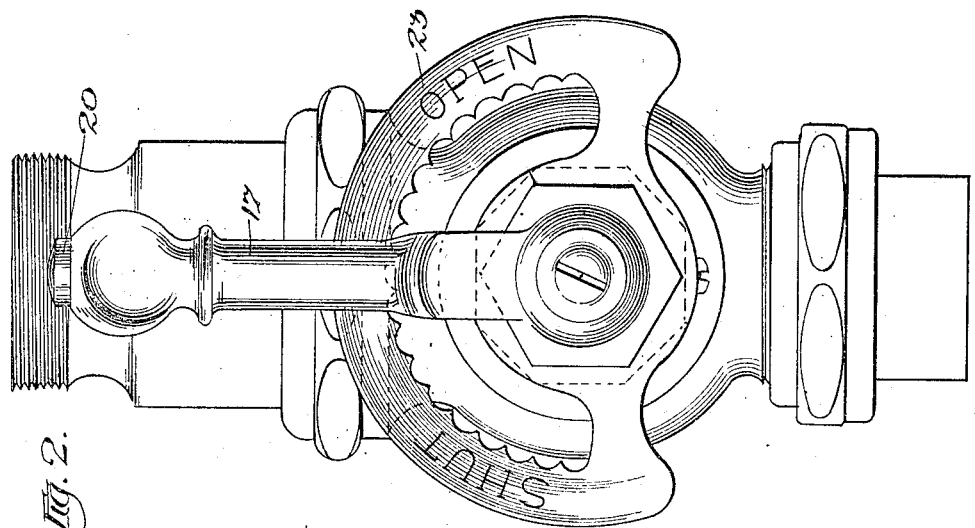
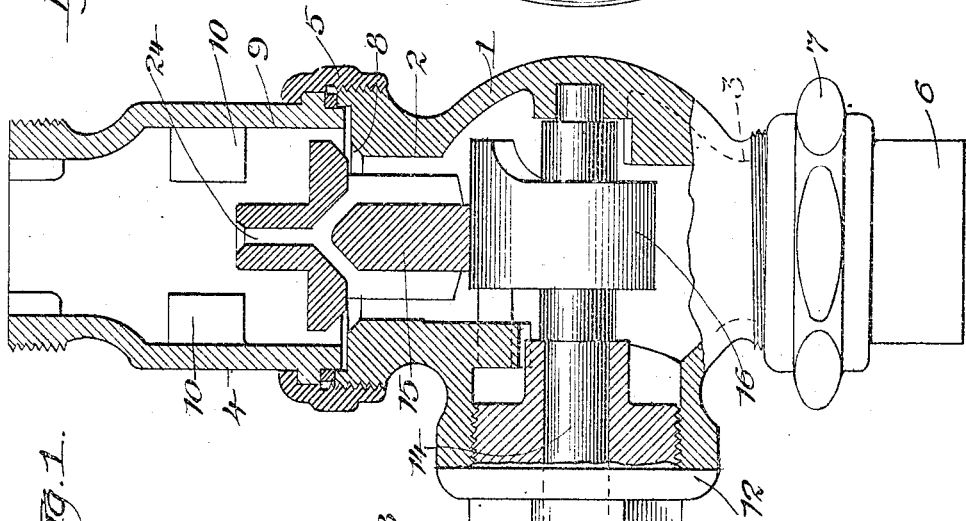

UNITED STATES PATENT OFFICE.

JOHN MILLER, OF CHICAGO, ILLINOIS, ASSIGNOR TO JAMES B. CLOW & SONS, OF CHICAGO, ILLINOIS, A CORPORATION OF ILLINOIS.

VALVE DEVICE.

943,838.   Specification of Letters Patent.   Patented Dec. 21, 1909.

Application filed July 20, 1908.   Serial No. 444,430.

*To all whom it may concern:*

Be it known that I, JOHN MILLER, a citizen of the United States, residing at Chicago, in the county of Cook and State of Illinois, have invented certain new and useful Improvements in Valve Devices, of which the following is a specification.

The present invention relates to valve devices which may be used for any purpose for which they may be found to be adapted, but which are particularly adapted for use in connection with what are known as continuous flow bath tubs. These bath tubs, which are used in the treatment of diseases, although of comparative recent origin, are well known to those skilled in the art and need no minute description here.

One object of the invention is to provide an improved means whereby the flow of water is continuously maintained.

Another object of the invention is to provide means whereby the valve is securely held in any position in which it may be set to provide a flow in excess of the minimum flow, and to make this means such that it cannot cut or injure the operator in manipulating the valve.

To these ends the invention consists in the features of novelty that are hereinafter described with reference to the accompanying drawing, which is made a part of this specification and in which:

Figure 1 is a view partly in section and partly in elevation, of a valve device embodying the invention. Fig. 2 is an elevation thereof.

The valve device has a casing, 1, having an inlet port, 2, and an outlet port, 3. With the inlet port 2 communicates a pipe-section, 4, having an external shoulder with which engages a cap, 5, having threaded engagement with the casing. With the outlet port 3 communicates a pipe-section, 6, having an external shoulder with which engages a cap, 7, having threaded engagement with the casing. The inlet port is surrounded by a valve seat, 8, to which is adapted a valve, 9, seating inward or in the direction of the flow of water and guided by any suitable means. Its movement away from its seat is limited by lugs, 10, formed on the interior of the pipe-section, 4.

The side of the casing is provided with an opening closed by a screw plug, 12, carrying a stuffing box, 13, and through this stuffing box passes an unthreaded valve-rod, 14, located at right angles to the stem, 15, of the valve, 9, and carrying an eccentric, 16, which engages said stem. This construction and arrangement of valve-stem, valve-rod and eccentric is precisely the same in all essential particulars as that shown in my application of even date herewith, Serial No. 444,429 and I do not claim it in this application.

Attached to the valve-rod is a hollow handle, 17, carrying a laterally projecting dog, 18, having a stem, 19, which passes through the bore of the handle. This bore is of three diameters. The portion of largest diameter is occupied by an enlarged head or push button, 20, carried at the upper end of the stem of the dog and the intermediate portion is occupied by a coiled spring, 21, which exerts its pressure in one direction upon the dog and in the opposite direction upon the handle. The dog occupies a longitudinal slot, 22, in the handle to prevent it from turning and its laterally projecting portion, which is cylindrical, engages a series of curved ratchet teeth on the inner surface of a sector, 23, secured to the stuffing box or other suitable part of the casing. To shift the position of the lever and thereby shift the position of the valve, with ease, the pressure is exerted on the push button and the dog thereby released from the ratchet, but the dog being cylindrical and the teeth curved the lever may be shifted without depressing the button. The sector is preferably marked with graduations for approximately indicating to the operator the volume of water flowing through the outlet port when the handle is in any given position.

To provide for the continuous flow of water, the valve is provided with a perforation or passage, 24, which extends completely through it, from face to face, and forms a by-pass through which a certain quantity of water may flow constantly whether the valve is seated or not.

What I claim as new is:

1. In a valve device, the combination of a casing having an inlet port, a valve seat surrounding said port, a valve adapted to said seat and seating inward, a valve rod, means for transmitting movement from the valve rod to the valve for unseating the valve, a handle secured to the valve rod, a dog carried by the handle and having a laterally projecting portion, a spring exerting its pressure in one direction upon the handle and in the other direction upon the dog, and a sector having a series of ratchet teeth, with which the dog engages, for holding the valve in any position in which it may be set for regulating the flow of water past it.

2. In a valve device, the combination of a casing having an inlet port, a valve seat surrounding said port, a valve adapted to said seat and seating inward, a valve rod, means for transmitting movement from the valve rod to the valve for unseating it, a handle secured to the valve rod, a dog carried by the handle and having a laterally projecting portion provided with a rounded working surface, a spring exerting its pressure in one direction upon the handle and in the other direction upon the dog, and a sector having ratchet teeth provided with rounded working surfaces with which the rounded working surface of the dog is adapted to engage.

3. In a valve device, the combination of a casing having an inlet port, a valve seat surrounding said port, a valve adapted to said seat and seating inward, a valve rod, means for transmitting movement from the valve rod to the valve for unseating it, a handle secured to the valve rod, a dog having a laterally projecting portion, a spring exerting its pressure outwardly upon the dog and inwardly upon the handle and a sector having ratchet teeth arranged on its internal surface with which the dog engages for holding the lever and consequently the valve in any position in which it may be set for regulating the flow of water past the valve.

4. In a valve device, the combination of a casing having an inlet port, a valve seat surrounding said port, a valve adapted to said seat and seating inward, a valve rod, an eccentric carried by the valve rod and engaging the valve for unseating it, a handle secured to the valve rod, a spring actuated dog carried by the handle, and a sector having ratchet teeth with which said dog is adapted to engage for holding the valve at any desired distance from its seat, for regulating the flow of water past it.

JOHN MILLER.

Witnesses:
 L. M. HOPKINS,
 SIGMUND TANZER.